April 19, 1960 P. J. GEERLINGS 2,933,063
TRANSPARENT COVER FOR HOG FEEDER
Filed July 17, 1959
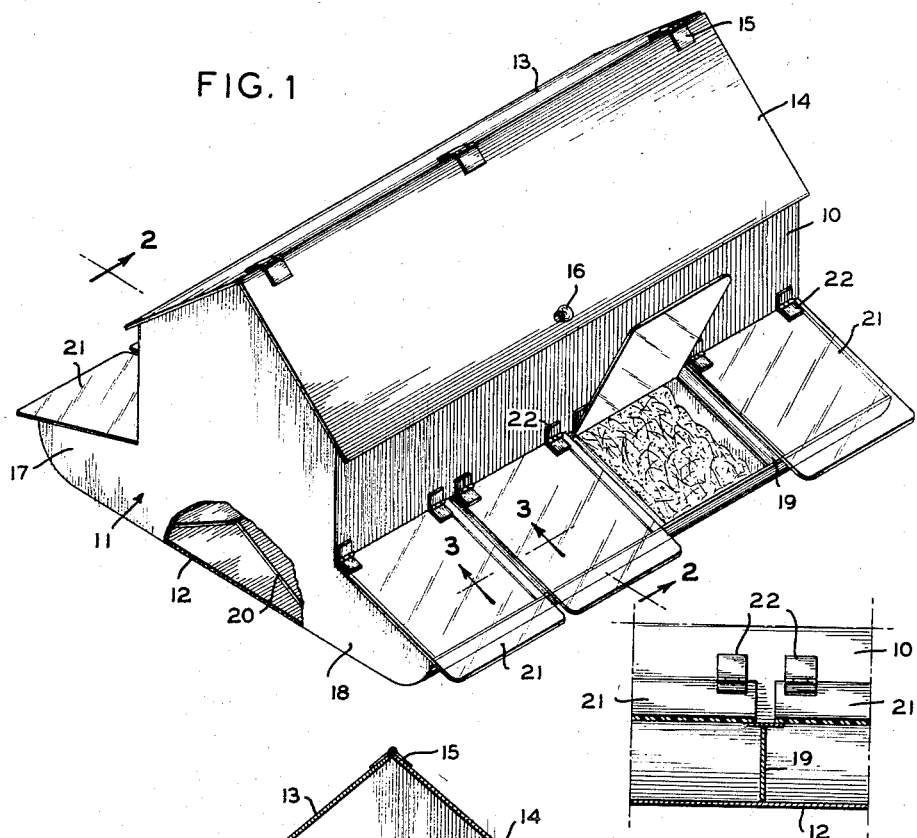
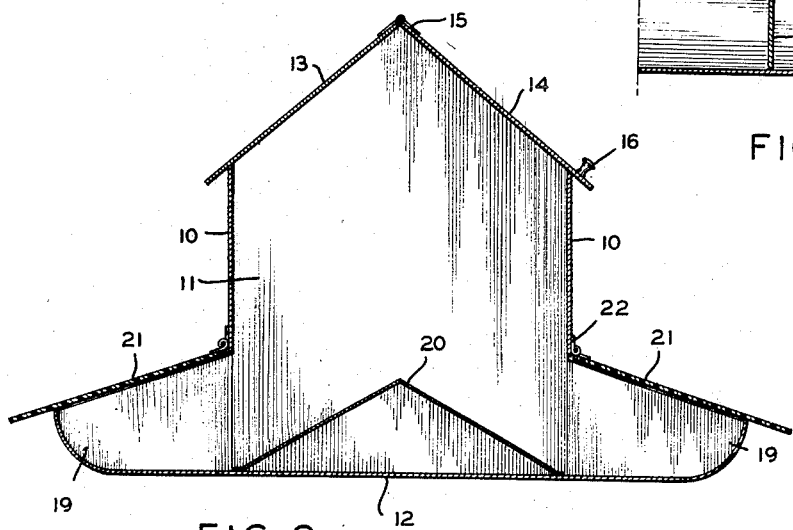
INVENTOR
P. J. GEERLINGS
BY H. Yates Dowell
ATTORNEY

United States Patent Office 2,933,063
Patented Apr. 19, 1960

2,933,063

TRANSPARENT COVER FOR HOG FEEDER

Petrus J. Geerlings, Waterloo, Iowa

Application July 17, 1959, Serial No. 827,927

5 Claims. (Cl. 119—52)

This invention relates to the feeding of livestock and to the equipment by which such feeding is accomplished and which equipment is designed to provide feed and promote the consumption thereof by animals to accelerate and improve their growth.

The invention relates to a hog feeder having partitions defining a series of compartments for the individual feeding of hogs and the like and provided with separate covers for the compartments for protecting the feed in the several compartments when not being consumed by animals.

Feeders for livestock have included storage compartments and individual feed troughs or feed chambers and some of such structures have had hinged lids or covers which could be raised to afford access to the compartments and which covers were designed to exclude snow, rain, rats, mice and the like and were made of metal and consequently relatively heavy. Feeders of this type having individual feed chambers and opaque metal lids or covers have not been entirely satisfactory due to the fact that they conceal the feed, lids could not be raised by the smaller of the animals and when closed lids or covers extended above the eyes of the animals and obstructed the light making the individual troughs relatively dark and uninviting and therefore discouraging the animals from inserting their heads in such dark chambers for feeding. Also the lids of prior devices were noisy and when hogs were feeding at night the noises were disturbing to other farm animals as well as the farmers.

It is an object of the invention to overcome the difficulties previously existing and to provide an animal livestock feeder having a hopper or storage compartment, a series of individual chambers or compartments providing food troughs supplied from such hopper or storage compartment and with hinged lids or covers of relatively light weight, transparent, non sound producing material such as plastic through which the contents of the individual compartments are readily visible and with the lid or cover of sufficiently light weight that it can readily be raised and access had to the feed by small animals and with such raised lids permitting the passage of light so that the heads of the animals will not be in dark chambers.

Another object of the invention is to provide a feeder which will satisfactorily contain a reserve supply of feed and will cause animals to eat more and grow fatter in a shorter period of time on less feed.

Other objects and advantasge of the invention will be apparent from the following description taken in conjunction with the accompanying drawing, wherein:

Fig. 1 is a perspective illustrating one application of the invention;

Fig. 2, a section on the line 2—2 of Fig. 1; and

Fig. 3, a fragmentary detail on the line 3—3 of Fig. 1.

Briefly stated, the feeder of the present invention comprises an elongated upright or columnar hopper or bin with a roof composed of a pair of inclined flat sides, one or both of which is mounted to be raised to permit filling the hopper and with lateral chambers on each side communicating with the hopper and provided with partitions each having a supporting strip along its upper edge with such partitions defining individual compartments in communication with the hopper to be kept filled with feed from the hopper at all times. Each compartment has three sides with at least one side having a generally flat supporting strip along its upper edge, said strip and the top edges of the other two sides being in a common plane. Each of the individual compartments is provided with a monoplanar transparent lid or cover hinged at its rear edge and with its front edge projecting beyond the feed trough in order that it may be engaged by hogs or other livestock and raised for access to the feed chambers beneath the same. The lids are of light weight transparent material such as plastic so that when an animal inserts its snout beneath the projecting end and raises the lid and inserts its head into the feed chamber, the cover will not form a curtain to create a dark hole in which the animal inserts its head but due to its transparency light will shine through the cover into the trough but nevertheless the lids perform the function of protecting from the weather, rats and the like.

With continued reference to the drawing, the present invention includes a columnar or upstanding hopper or bin having upright side and end walls 10 and 11 respectively, a bottom 12 and a cover composed of a pair of flat members 13 and 14. The flat member 14 is mounted on hinges 15 and has a knob or handle 16 by which it may be raised to allow the introduction of feed into the hopper.

The lower ends of the hopper are enlarged so that the opposed extremities 17 at one side of the device and 18 at the opposite side define between them a trough and partitions 19 are employed to divide the trough into individual compartments. Along the center of the hopper is a ridge member 20 to cause the feed to move outwardly into such individual chambers or compartments which form the feed troughs for the animals and each of which is supplied with feed from the hopper. Individual covers or lids 21 are provided for each of the feed trough forming chambers or compartments, such lids being of relatively thin, light weight plastic mounted by means of hinges 22 secured to the side walls 10 of the hopper. The lower edges of the lids 21 are provided with rounded corners and such edges project beyond the walls 18 in a manner to be engaged by the animals to raise the lids to obtain access to the feed within the compartments. The lids are mounted side by side with their lateral edges relatively close together but not interfering one with another.

By the use of relatively light weight, transparent, noiseless lids substantial advantages are obtained, it being possible for the animals to see the feed when the lids are closed, for the smaller animals to raise the lids, for the animals to eat without obstructing the light and for the lids to close without making disturbing noises. Also the vitamin content of the feed is enhanced by the exposure to natural sunlight and when the heads of animals are inserted the compartments are not dark since the lids do not form curtains which shut out the light but on the other hand the animals can see what they are eating.

As will be understood from the foregoing, an improved feeder is provided by which fattening of hogs and the like can be accomplished in less time with less feed.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A hog feeder having means defining an upright chamber and a laterally disposed upwardly opening individual compartment having three sides with at least one side having a generally flat supporting strip along its upper edge, said strip and the top edges of the other two sides being in a common plane, a monoplanar transparent hinged cover on said lateral compartment, said cover being of relatively light weight and of a size that its lateral edge overlies said supporting strip and provides a seal therewith, said cover having a portion exposed for engagement and raising of the cover by the animals seeking access to the feed in the compartment.

2. The structure of claim 1 in which said individual compartment is one of a series with each partition and supporting strip along the upper edge of the same receiving the contiguous edges of a pair of covers of adjacent individual compartments.

3. The structure of claim 1 in which said upright chamber constitutes a hopper and with a series of such individual compartments on opposite sides of the same and supplied therefrom.

4. The structure of claim 1 in which said upright chamber is centrally disposed and is of a size to receive feed in bulk and to provide a constant supply for a series of laterally disposed compartments.

5. The structure of claim 1 in which a trough-forming base is provided having a central raised portion beneath said upright chamber and a trough-forming portion beneath said individual compartments.

References Cited in the file of this patent

UNITED STATES PATENTS

| | | |
|---|---|---|
| 1,881,820 | McCollough et al. | Oct. 11, 1932 |
| 2,417,484 | Gifford et al. | Mar. 18, 1947 |